US012327222B2

(12) United States Patent
Puthenveetil et al.

(10) Patent No.: US 12,327,222 B2
(45) Date of Patent: Jun. 10, 2025

(54) SYSTEM AND METHOD PROVIDING AN IMPROVED, AUTOMATED PROCUREMENT SYSTEM USING ARTIFICIAL INTELLIGENCE

(71) Applicant: QMerit, Inc., Irvine, CA (US)

(72) Inventors: Manoj Puthenveetil, Trabuco Canyon, CA (US); Tracy K. Price, Dana Point, CA (US); Brett A. Knox, Dana Point, CA (US); Jeffrey R. Golden, Powhatan, VA (US); Erik Florida, Huntington Beach, CA (US); Zachary Walls, Aliso Viejo, CA (US); Peter M. Lew, IV, Laguna Hills, CA (US); Richard Han, Yorba Linda, CA (US); Matthew D. Desio, Yorba Linda, CA (US); Jacob A. Van Leuven, Irvine, CA (US)

(73) Assignee: Raiven, Inc., Irvine, CA (US)

( * ) Notice: Subject to any disclaimer, the term of this patent is extended or adjusted under 35 U.S.C. 154(b) by 417 days.

(21) Appl. No.: 17/764,122

(22) PCT Filed: Sep. 22, 2020

(86) PCT No.: PCT/US2020/052029
§ 371 (c)(1),
(2) Date: Mar. 25, 2022

(87) PCT Pub. No.: WO2021/061663
PCT Pub. Date: Apr. 1, 2021

(65) Prior Publication Data
US 2022/0405706 A1 Dec. 22, 2022

Related U.S. Application Data

(60) Provisional application No. 62/906,716, filed on Sep. 26, 2019.

(51) Int. Cl.
G06Q 10/0875 (2023.01)
G06Q 30/0601 (2023.01)
G06Q 10/10 (2023.01)

(52) U.S. Cl.
CPC ..... *G06Q 10/0875* (2013.01); *G06Q 30/0629* (2013.01); *G06Q 30/0631* (2013.01); *G06Q 30/0643* (2013.01)

(58) Field of Classification Search
CPC .......... G06Q 10/0875; G06Q 30/0629; G06Q 30/0631; G06Q 30/0643; G06Q 10/087;
(Continued)

(56) References Cited

U.S. PATENT DOCUMENTS 9,779,364 B1 * 10/2017 Hoover .............. G06Q 30/0206
10,643,178 B1 * 5/2020 Kitson .................... H04L 67/02
(Continued)

*Primary Examiner* — Garcia Ade
(74) *Attorney, Agent, or Firm* — Rutan & Tucker LLP

(57) ABSTRACT

A system and a computerized method are disclosed that each include or cause performance of various computerized operations. The computerized operations include receiving user input corresponding to product information corresponding to a retail item searched for via a network device, performing pre-processing operations on the product information, querying one or more data stores to obtain potential buying options corresponding to the searched-for retail item, wherein each of the one or more data stores house information corresponding to a preferred supplier, analyzing query results based on at least on proprietary, organization-specific procurement rules to determine at least one recommended buying option, and causing the rendering of at least a portion of a graphical user interface on the network device that displays the at least one recommended buying option. The user input may be received by a web browser plug-in processing on the network device.

22 Claims, 8 Drawing Sheets

(58) Field of Classification Search
CPC ...... G06Q 10/00; G06Q 30/0601; G06N 5/04; G06N 20/00
USPC .......................................................... 705/29
See application file for complete search history.

(56) References Cited

U.S. PATENT DOCUMENTS

| | | | |
|---|---|---|---|
| 10,685,308 B1* | 6/2020 | Avery, Jr. ................ | H04L 67/10 |
| 2012/0130857 A1* | 5/2012 | Thomas ............. | G06Q 30/0627 |
| | | | 705/26.63 |
| 2020/0175464 A1* | 6/2020 | Ferguson ........... | G06Q 30/0601 |
| 2020/0211082 A1* | 7/2020 | Kovacevic ......... | G06Q 30/0631 |

* cited by examiner

300

SYSTEM AND METHOD PROVIDING AN IMPROVED, AUTOMATED PROCUREMENT SYSTEM USING ARTIFICIAL INTELLIGENCE

PRIORITY

This application is a U.S. national stage application of International Application No. PCT/US2020/052029, filed Sep. 22, 2020, which is incorporated by reference in its entirety into this application.

This application claims the benefit of priority to U.S. Provisional Application No. 62/906,716, filed Sep. 26, 2019, which is incorporated by reference in its entirety into this application.

FIELD

Embodiments of the disclosure relate to the field of automated procurement systems and methods. More specifically, embodiments of the disclosure relate to a system providing an automated procurement system accessible via a web browser plug-in installed on a network device that utilizes artificial intelligence to determine potential buying options.

GENERAL BACKGROUND

Most businesses procure materials and labor services from hundreds of vendors in the course of doing business and there are thousands of manufacturers and suppliers who can provide labor and materials. The purchasing process can vary significantly from business to business and may largely depend on the size of the organization.

In most organizations, a central authority (e.g., a designated employee or a committee) sets procurement rules and establishes preferred purchasing agreements with manufactures and suppliers in order to optimize the value the organization receives. However, purchasing is generally distributed across the organization and will involve many different employees or even contractors acting as buyers.

Typical purchasing decisions in a business are often complex as each purchasing decision often involves considerations of several dynamic business variables such as price, urgency, quantity, availability, customer preferences, profit margin, product specifications, and much more. The sheer number of parameters that an organization needs to consider brings several challenges in implementing procurement rules directed to establish a common purchasing process for each individual across the entire organization.

A common challenge that both parts and labor procurement share, is the increasing decentralization of decision-making that occurs around how labor and parts are selected, measured, purchased and deployed. Often, decisions need to be made at the point of service that can affect both the ultimate price and value derived for the work or part provided.

For example, a technician fixing a rooftop package unit may need a part that he or she does not have on-hand at a customer site. However, the decision to purchase the needed part may carry significant value and price implications. For instance, the technician may be forced to decide whether to order the part from a retailer and have the part shipped for next-day delivery, resulting in a postponement of the current work, or, whether the technician should drive to a retailer to purchase the part directly. Further, numerous retailers may sell the same or comparable item; therefore, decisions such as selecting a retailer from which to purchase the part based on availability and urgency, selecting a brand-name or generic part, etc., need to be made. Determining the value of each decision is currently unknown and uncaptured further complicating an organization's attempt to create a common purchasing process for all employees (e.g., company technicians) and contingent labor (e.g. technicians working for $3^{rd}$ party contractors).

As a result, huge inefficiencies arise in how decisions are made by many technicians across an equally broad domain of technical services that are provided to an equally complex set of customer sites and facilities. Shipping costs, part quality, durability, group purchasing programs, customer loyalty programs, product availability/timing, tariffs and other aspects all contribute to a gap in price-paid and objective value delivered.

Currently, organizations are unable to efficiently make decisions about both labor and materials that provide greatest value to the organization. For example, an employee responsible for purchasing parts and/or materials merely researches a limited set of web sites and selects the lowest price. In reality, there are multitudes of variables that determine the greatest value for a given organization, some of which include the availability of a part, contractual benefits offered to that organization by certain suppliers, past performance of the supplier (e.g., responsiveness, dependability, quality, etc. creates Qmerit's proprietary Contribution Index (QCI) score), fully burdened cost of the technician, the cost of processing multiple invoices, transportation cost associated with getting the part to field staff, drive time to pick up the part, delivery options, opportunity cost of assigning the technician to pick up the part vs. him/her going to another service call, familiarity of the field technician who needs to install the part, etc. Not only would the task of taking into account all these variables be impractical for a human, the variables are dynamic and may change in real-time (e.g., traffic patterns, availability of a replacement part at a particular retailer, cost of delivery service vs. cost of technician, urgency of the repair, shipping costs may change instantly depending on the time of day, etc.).

Further, those who have purchased certain types of materials or built relationships with select labor and materials vendors believe they know who the best source is for a specific buying decision. However, learning this information is not trivial or necessarily fact-based. Furthermore, this knowledge is not immune to sudden and/or drastic changes. Items are discontinued, innovation produces better alternative products, wide impacts to pricing can occur instantly and unexpectedly (i.e. dynamic pricing is becoming prevalent with suppliers), all of which contribute to changing the actual greatest value from the "apparent" value traditionally perceived to exist by the purchaser. There is no manual or direct way for someone to keep track of the greatest value option given the extreme number of variables and their elastic propensity towards fluctuation.

Currently, most organizations implement a Procure-To-Pay (P2P) process and use several P2P software packages to bring better control over the purchasing process. However, these P2P software solutions may solve the problem of bringing control over the static procurement process but fail to solve for the dynamic variables that influence purchasing decisions at the point of service. Further, most P2P software implementations take a long time to produce a purchasing recommendation and require careful change management to achieve adoption.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
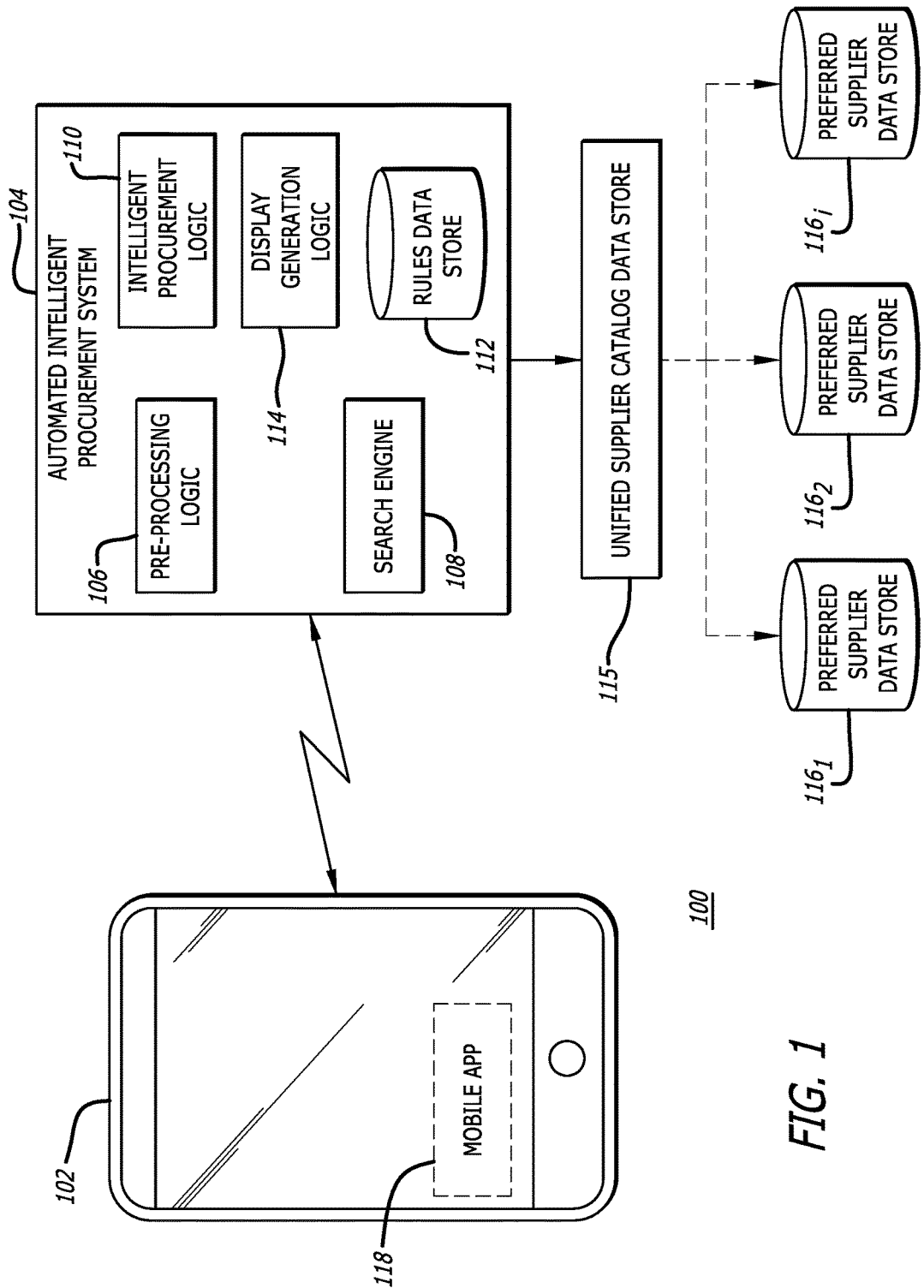
FIG. 1 is a block diagram illustrating an automated, intelligent procurement system in accordance with some embodiments.

Various embodiments of the disclosure relate to an automated, intelligent procurement system that improves the current state of procurements services through the automatization of obtaining information from a network device and analyzing the obtained information in accordance with a value-analysis engine and proprietary, organization-specific procurement rules.

In one embodiment, the automated, intelligent procurement system may include logic that is configured to be installed and execute on a network device, and logic that is configured to execute on a server device. For example, the logic configured to be installed on a network device may be a browser plug-in and/or mobile application downloadable via a network. The mobile application may be available in any public "application store," such as the APPLE APP STORE®, the MICROSOFT® store and/or GOOGLE PLAY™ store. Upon download and install of the mobile application on the network device, the logic of the mobile application may render various graphic user interfaces (GUIs) in order to receive user input pertaining to establishment of a user profile, including the establishment of authentication credentials (username, password, etc.) in order to associate the user with an organization and the proprietary, organization-specific procurement rules.

The automated, intelligent procurement (AIP) system may comprise a proprietary logic engine that, in some embodiments, utilizes artificial intelligence. The AIP system may be tuned (e.g., configured with various parameters) for a given organization to improve their procurement process by taking into account hundreds of dynamic business variables and/or hundreds of predefined procurement rules to provide purchasing options providing improved value as compared to a non-recommended purchase (such as from a big box retailer). The automated, intelligent procurement (AIP) system may be accessed via multiple user experience channels including but not limited to a web browser plug-in, a mobile application, an electronic list of parts with varying quantities and/or a virtual shopping cart analyzer.

The AIP system utilizes a complex logic-based approach to account for numerous, dynamic variables to provide purchasing options and/or recommendations that may improve the value derived from a purchase as compared to traditional purchases from a big box retailer, for example. As an initial overview, the AIP system receives user input (e.g., a search for a retail item), which is then passed through a pre-processing logic to decipher the user's procurement need and then normalized for optimum search for best value. In some embodiments, deciphering the user's procurement need involves: (i) performing an image recognition process on an image or parsing content of a web page for certain keywords that identify an item category such as tools, lighting, HVAC, etc. to determine for what the user is searching; and (ii) identifying a unit of measurement, when applicable (e.g., size of a ladder may be in feet or meters). A similar technique is applied when the user accesses the system via SMS or email as well.

Normalizing is a technique used to make comparisons possible. For example, different vendors may include, for each item listed on its website: a unit of measurement; a brand; and other information in the name of a product. For example, "Louisville Fiberglass Ladder 28 ft." The same product may be called an "Extension Ladder" from another supplier with the brand name "Louisville," dimension 28 ft, and type of fiberglass all documented as attributes of the item. Normalizing the data allows us to recognize that both are the same products. The data normalization varies by product category. For instance, a vector may be generated for an item of appearing on a webpage, e.g., the "searched-for item," wherein each component of a vector corresponds to a particular attribute of the item. An attributes are dynamic based on the category of the product being parsed. A ladder may have max load capacity, length and material type as attributes, whereas a light bulb may have lumens, wattage, and holder type. Thus, upon parsing a website, the searched-for item's attributes may be extracted and placed in a vector, such that the vector representing the searched-for item may be compared to vectors having a similar format within a unified supplier catalog data store 115, which may be comprised of the preferred supplier data stores $116_1$-$116_i$.

One or more queries are then generated and transmitted to the preferred supplier data stores $116_1$-$116_i$ or the local unified supplier catalog data store 115 representing the preferred supplier catalogs. The queries extract information corresponding to the same or a comparable item as the searched-for retail item (e.g., based on comparison of corresponding vector components between the searched-for item and each item stored in the data stores). The search results from each preferred data stores and/or the local unified data store are coalesced into a normalized search output and then analyzed in light of a plurality of dynamic business variables. These variables include max price threshold, availability preference, warranty threshold, shipping cost tolerance, rebate agreement discount factor, estimated local pick-up cost, multiple-invoice administration cost, drive-time tolerance, request urgency, and much more. Some of these business variables are classified as required or optional for each organization. The AIP system scores each result based on the weights assigned to the above dynamic business variables and orders them based on their rank.

The AIP system may then apply proprietary, organization-specific procurement rules, which narrows the results from the one or more queries. For example, an organization may prefer for that all safety-related products be purchased from a given supplier even as long as the cost is within 15% of all other suppliers. Such a rule may be predetermined and included within the rules data store 112. Other rules may be predefined that take into consideration volume discounts previously agreed-upon by the customer and a preferred supplier (e.g., where that discount is not universally applied to all of the preferred supplier's customers). Other rules may be relevant to only particular items (e.g., a rule may be defined on a part-by-part basis, wherein a first rule may apply to a water heater and a second rule apply to an air conditioning unit component). Yet other rules may take into consideration the hourly rate of the responsible technician. The above discussion is not intended to be limiting to the types of rules that may be predefined and stored in the rules data store 112. The narrowed results may then be further narrowed (e.g., selection of a subset of the narrowed results) and provide the results to the user via a graphical user interface of a network device (e.g., mobile phone).

Additionally, the AIP system may calculate a real-time supplier performance score known as a Qmerit Contribution Index (QCI) for all parties involved in a given workflow. This index is the utilized by the AIP system in determining the purchasing options to provide to the user. QCI is an index, e.g., a score, created by taking into account a number of supplier performance data to arrive at a number 0-1000. The factors affecting the index may include items related to a number of categories including, but not limited or restrict to, professionalism, safety, quality, certifications, and pricing. Each of these categories may have several sub-categories. Each category and sub-category may be provided a weight. In determining a supplier's QCI score, the AIP system will measure each data point for every interaction on a predetermined frequency and use that to calculate a supplier QCI score. This score is then used in determining which supplier parts are surfaced in the search results.

As used herein, the transmission of data may take the form of transmission of electrical signals and/or electromagnetic radiation (e.g., radio waves, microwaves, ultraviolet (UV) waves, etc.).

Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "processing" may include launching a mobile application wherein launching should be interpreted as placing the mobile application in an open state and performing simulations of actions typical of human interactions with the mobile application. For example, the mobile application, FACEBOOK®, may be processed such that the mobile application is opened and actions such as selecting to view a profile, scrolling through a newsfeed, and selecting and activating a link from the newsfeed are performed.

The term "mobile application" should be construed as a logic, software, or electronically executable instructions comprising a module, the mobile application being downloadable and installable on a network device. A mobile application may be a software application that is specifically designed to run on an operating system for a network device. Additionally, a mobile application may provide a graphical user interface (GUI) for the user of the network device.

The term "network device" should be construed as any electronic device with the capability of connecting to a network, downloading and installing mobile applications. Such a network may be a public network such as the Internet or a private network such as a wireless data telecommunication network, wide area network, a type of local area network (LAN), or a combination of networks. Examples of a network device may include, but are not limited or restricted to, a personal computer, a laptop, a mobile phone, a tablet, etc. Herein, the terms "network device," "endpoint device," and "mobile device" will be used interchangeably. The terms "mobile application" and "application" should be interpreted as logic, software or other electronically executable instructions developed to run specifically on a mobile or desktop network device.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The invention may be utilized for providing an automated, intelligent procurement system through the combination of a web browser plug-in installed on a network device communicatively coupled to logic operating on a server device via a network (e.g., the internet). As this invention is susceptible to embodiments of many different forms, it is intended that the present disclosure is to be considered as an example of the principles of the invention and not intended to limit the invention to the specific embodiments shown and described.

General Architecture of the Automated, Intelligent Procurement System

Referring to FIG. 1, a block diagram illustrating an automated, intelligent procurement (AIP) system is shown in accordance with some embodiments. FIG. 1 illustrates a networked environment that includes a network device 102 communicatively coupled to the AIP system 104, which includes at least a pre-processing logic 106, a search engine 108, an intelligent procurement logic 110, a rules data store 112 and a display generation logic 114. The AIP system 104 is also communicatively coupled to one or more preferred supplier data stores $116_1$-$116_i$ that are each configured to store information relevant to a particular preferred supplier. A supplier may be "preferred" by one or more organizations (e.g., customers or clients). As will be discussed further below, when the AIP system 104 receives product information from the network device 102, an organization indicator will be received such that the AIP system 104 may correlate the organization indicator with a table identifying which suppliers are preferred by the particular organization associated with the network device 102.

FIG. 1 also illustrates that the network device 102 includes a web browser plug-in 118 installed thereon. The web browser plug-in 118, being a component of the AIP system 104, may be a browser plug-in for desktop or mobile computers or a mobile application available in any public "application store" (or "app store") such as the APPLE APP STORE® and/or GOOGLE PLAY™ store. Upon download and install of the web browser plug-in 118 on the network device 102, the logic of the web browser plug-in 118 (generally referred to as "the web browser plug-in") may render various graphic user interfaces (GUIs) in order to receive user input pertaining to establishment of a user profile, including the establishment of authentication credentials (username, password, etc.) in order to associate the user with an organization and the proprietary, organization-specific procurement rules. In addition, the web browser plug-in 118 may integrate with one or more internet web browser also installed on the network device 102 in order to obtain user input corresponding to retail items for which a user may be searching to purchase.

As will be discussed below, upon obtaining the user input, the web browser plug-in 118 transmits product information corresponding to the searched-for retail item to the AIP system 104. In addition to the product information, the web browser plug-in 118 may transmit to the AIP system 104: (i) an organization identifier, and (ii) optionally, an employee identifier. The organization identifier enables the AIP system 104 to determine which preferred supplier data stores $116_1$-$116_i$ to query when the search engine performs search queries for potential buying options corresponding to the searched-for retail item and the employee identifier may be used to restrict results from supplier data stores 114, enhance information delivered to AIP system 104 and to track individual search and buying behavior.

In some embodiments, at least a first queried data store of the data stores $116_1$-$116_i$, is normalized and contains domain-specific tagging. Domain-specific tagging may refer to predetermined industry-specific tags. As one non-limiting example, the term "wire connector" may be interchangeable with the term "wire nut" according to electricians (i.e., experts or professionals within a particular industry) such that the terms "wire connector" and "wire nut" would be cross-referenced such that products including each term in a name or description would be returned in a single query.

Additionally, in some embodiments, the content within a normalized data store may be cross-referenced using a machine learning model. The machine learning model may be trained on a set of products for each of a plurality of product categories. In other embodiments, the content within a normalized data store is cross-referenced using an artificial intelligence algorithm including one or more rule sets (which may include a listing of terms to be cross-referenced). In either embodiment, terms to be cross-referenced may be pulled from a product's name, description, associated key words, or in some embodiments, reviews of the product (such as those that are published on a supplier's website).

Further, results of either the application of the machine learning model or other artificial intelligence algorithms are stored in a normalized data store, where the normalized data store is configured to be queried during subsequent cross-referencing operations. Thus, storage of the cross-referencing may act as a cache and provide a quick look-up for subsequent queries for a product name or a specific term.

In some embodiments, the employee identifier may be integrated into reimbursement or billing software such that when an employee is using a personal credit card, or when a third-party is paying for the retail item (i.e., an employer), the purchase made through the AIP system 104 may automatically appear in corresponding reimbursement software.

As an illustrative example of operations performed by the AIP system 104, the web browser plug-in 118, executing on the network device 102, may operate as a daemon, i.e., a background process out of control of a user, configured to obtain user input corresponding to a retail item that has been searched for by a user through an internet web browser. In one embodiment, the web browser plug-in 118 may identify specified user input fields by scanning the HTML code comprising a web page for tags, e.g., input tags such as, but not limited or restricted to, the Form tag, the Submit input tag, the Dropdown option tag, the Radio button tag, etc. When user input is received by the webpage via one of the user input fields, the web browser plug-in 118 may make a copy of the received user input. Upon capturing a copy of the received user input, the copy or information representing the copy is transmitted to the AIP system 104 operating on a server device. It should be understood that the AIP system 104 includes components running on a server device, e.g., a cloud computing services, as well as the web browser plug-in 118 component that operates on a network device.

The AIP system 104 running on the server device includes the pre-processing logic 106, which, upon execution by one or more processors, performs pre-processing operations including: (1) deciphering the user's procurement need, and (2) normalizing the received user input, as discussed above.

Following the pre-processing operations, the search engine 108 receives the pre-processed product information. The search engine 108 may be logic as defined above and, upon execution by one or more processors, perform operations including alternate product search, synonym search, schema-less product information mining, image search, tunable attribute boosting. Search engine compiles a list all available results ordered by relevance up to a max number for real-time price check from preferred suppliers through supplier provided Application Program Interface (API). The search may be conducted against a proprietary data store with normalized product information from multiple preferred supplier or against each individual supplier data source in real-time. Search uses both schema based search for known attributes and schema-less search for product attribute.

The search results are provided to the intelligent procurement logic 110, which, upon execution by one or more processors, performs operations including refining the search results based on organizational parameters such as normalizing the price to incorporate benefits an organization receives such as next day shipping, added warranty, single invoice, QCI score, etc. Once the price is normalized for comparison, organizational rules are applied to order the search results in the order of greatest value. An organizational rule may recommend to buy from a preferred supplier even if the price is higher up to a predefined threshold (e.g., 10%).

Following the analysis by the intelligent procurement logic 110, one or more potential buying options are provided to the network device 102, and specifically, the web browser plug-in 118. For example, the display generation logic 114 may generate instructions corresponding to the rendering of a graphical user interface (GUI). The web browser plug-in 118 then, upon execution by one or more processors of the network device 102, cause rendering of at least a portion of a graphical user interface displaying the one or more potential buying options. In some embodiments, the web browser plug-in 118 alters the display of a web page being displayed by an internet web browser in order to provide a user with alternative buying options for the same, or comparable, retail items. In particular, the potential buying options displayed by the web browser plug-in 118 are offered for purchase by preferred suppliers of the organization associated with the network device 102.

In addition to causing the display of one or more potential buying options on a display of the network device 102, the web browser plug-in 118 may receive additional user input corresponding to the selection of a potential buying option. Based on the additional user input, the AIP system 104 may perform operations corresponding to a virtual check-out, i.e., selecting a product from a web page or mobile application and providing billing and shipping information resulting in a purchase over a network using an electronic device. In a first embodiment, the virtual check-out operations may include re-routing the web page displayed on the network device 102 to a website corresponding to the selected potential buying option. In a second embodiment, the virtual check-out operations may include providing information corresponding to the selected potential buying option to the AIP system 104 operating on the server device, which may be configured to provide additional instructions to the web browser plug-in 118 that cause rendering of a display of a virtual shopping cart and facilitate the exchange of purchase information. The purchase information may include quantity, shipping information, billing information, discount code(s), and a confirmation number.

The virtual check-out may include an option for the user to select delivery using traditional mail delivery services, such as the United States Postal Service (USPS) or the United Parcel Service (UPS). The delivery options may include expediency options such as next-day air or two-day delivery. Local pick-up (e.g., from a preferred supplier) may also be provided as a delivery option. Additionally, other delivery services may also be selected such as a delivery service that uses a mobile application to facilitate ordering and delivery (e.g., GRUBHUB®, LYFT®, Uber™, etc.).

Logical Representation of the Automated, Intelligent Procurement System

Figure 2:
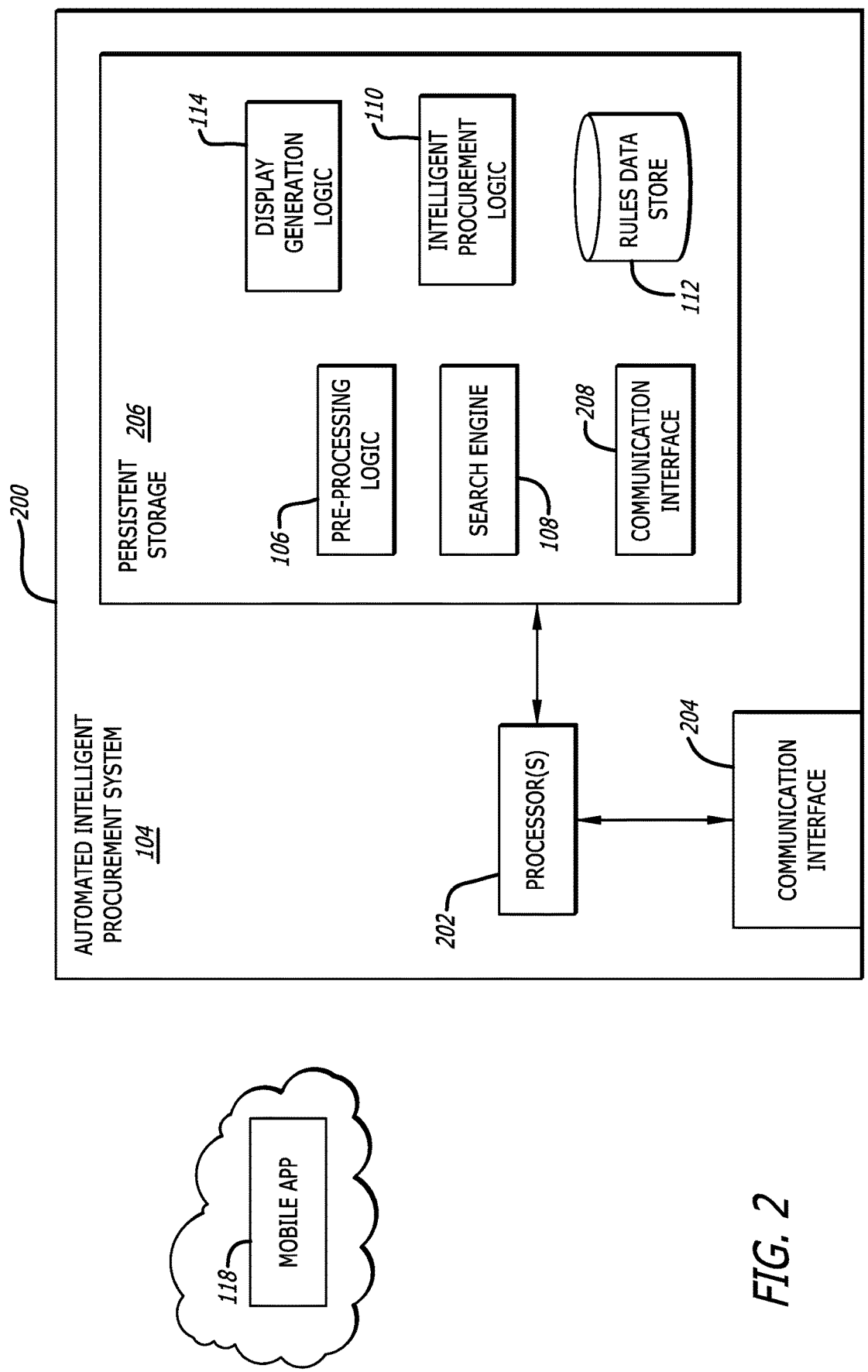
FIG. 2 is an illustrative embodiment of a logical representation of the automated, intelligent procurement system of FIG. 1 in accordance with some embodiments.

Referring to FIG. 2, an illustrative embodiment of a logical representation of the automated, intelligent procurement system 104 of FIG. 1 is shown in accordance with some embodiments. The automated, intelligent procurement (AIP) system 104 may be stored on a non-transitory computer-readable storage medium of a server device that includes a housing 200, which is made entirely or partially of a hardened material (e.g., hardened plastic, metal, glass, composite or any combination thereof) that protects the circuitry within the housing 200, namely one or more processors 202 that are coupled to a communication interface 204. The communication interface 204, in combination with a communication interface logic 208, enables communications with external network devices, and logic executing thereon, to receive at least product information and/or other user input corresponding to a retail item. According to one embodiment of the disclosure, the communication interface 204 may be implemented as a physical interface including one or more ports for wired connectors. Additionally, or in the alternative, the communication interface 204 may be implemented with one or more radio units for supporting wireless communications with other electronic devices. The communication interface logic 208 may include logic for performing operations of receiving and transmitting one or more objects via the communication interface 204 to enable communication between the AIP system 104 and network devices via a network (e.g., the internet) and/or cloud computing services.

The processor(s) 202 is further coupled to a persistent storage 206. According to one embodiment of the disclosure, the persistent storage 206 may include: the pre-processing logic 106, the search engine 108, the intelligent procurement logic 110, the rules data store 112, the display generation logic 114 and the communication interface logic 208. Of course, when implemented as hardware, one or more of these logic units could be implemented separately from each other.

Exemplary Methodology

Figure 3:
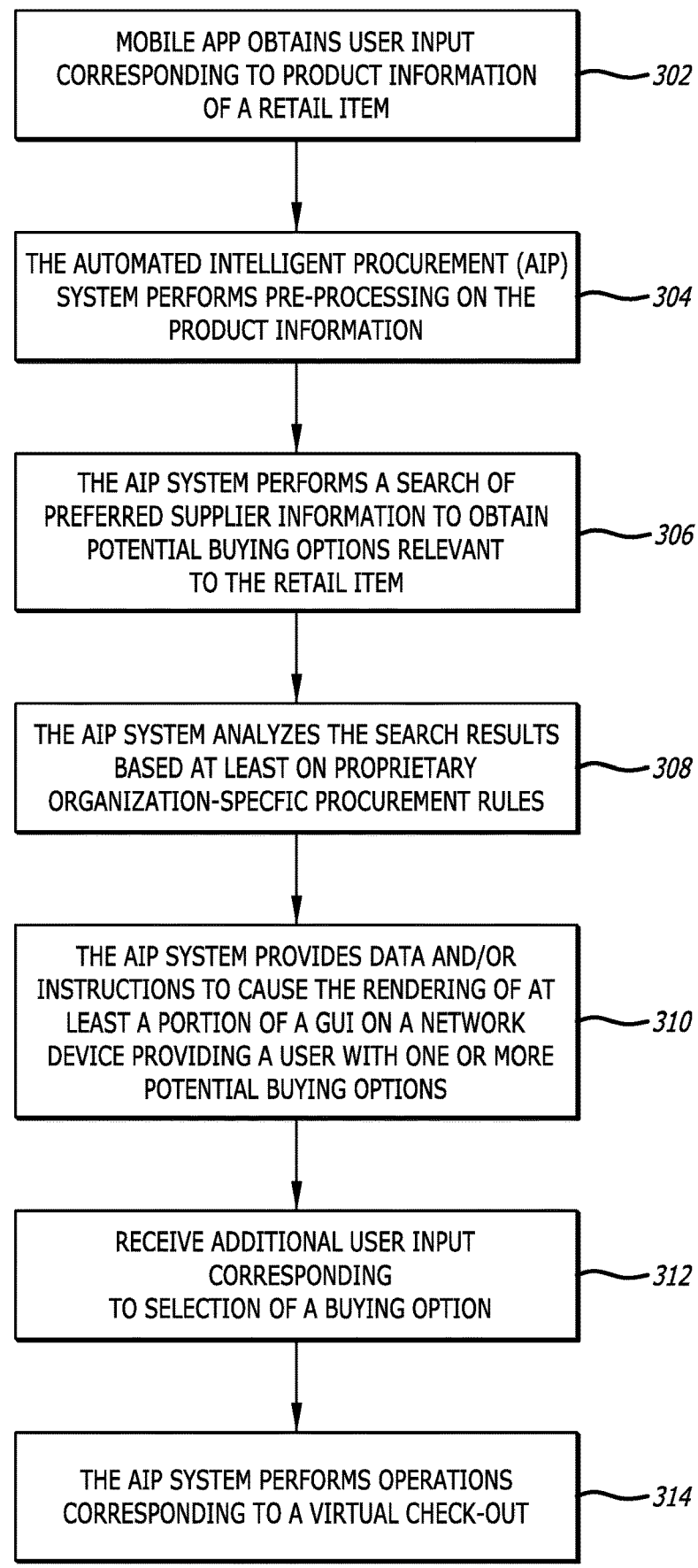
FIG. 3 is an embodiment of a flowchart illustrating operations of the automated, intelligent procurement system of FIG. 1 in accordance with some embodiments.

Referring to FIG. 3, an embodiment of a flowchart illustrating operations of the automated, intelligent procurement (AIP) system of FIG. 1 is shown in accordance with some embodiments. Each block illustrated in FIG. 3 represents an operation performed in the method 300 of automatically and intelligently causing rendering of at least a portion of a graphical user interface on a user's network device displaying potential purchasing options based on a retail item corresponding to received user input. Prior to the beginning of method 300, it is assumed that a web browser plug-in of the AIP system has been installed on a network device also having installed thereon a compatible internet browser. Herein, the method 300 begins when the web browser plug-in obtains user input corresponding to product information of a retail item, e.g., a retail item searched for by a user (block 302). For example, the web browser plug-in may identify specified user input fields by scanning the HTML code of a web page for input tags, and capture (extract) a copy of the received user input. At least a representation of the copy is transmitted to the AIP system 104 operating on a server device.

Following receipt of the product information, the AIP system performs pre-processing operations on the product information (block 304). As discussed in more detail below, the pre-processing operations may include at least: (1) deciphering the user's procurement need, and (2) normalizing the received user input.

Subsequently, the AIP system performs a search of preferred supplier information to obtain potential buying options relevant to the retail item (block 306). Following the pre-processing operations, the search engine of the AIP system receives the pre-processed product information and performs an analysis of the pre-processed product information and information stored in one or more preferred supplier data stores. In some embodiments, the AIP system may query one or more preferred supplier data stores based on the pre-processed product information to obtain product information of retail items that are identical, or similar, to the retail item searched for by the user. In one example, the received product information may include a manufacturer part number, such that each preferred supplier data store may be queried for the particular manufacturer part number to determine whether each preferred data store has information stored therein of the identical retail item that was searched for by the user. Often, the search queries are much more complex and include several product details either provided by the user or automatically collected by the requesting system that includes SKU, Manufacturer Part ID, UNSPSC code, European Article Number (EAN), Global Trade Item Number (GTIN), Universal Product Code (UPC), Product Name, Product Image, Product Description, Unit of Measurement (UoM), Reference Price, and other product category specific details. The search can be performed against either the supplier data stores in real-time or against a proprietary normalized data store.

Specifically, the search engine may utilize an organization identifier associated with the representation of the received user input to restrict the preferred supplier data stores queried during the analysis to those data stores corresponding to preferred suppliers of the organization affiliated with the user providing the user input. In this manner, the AIP system significantly improves the efficiency of the procurement process by avoiding a search of buying options provided by non-preferred suppliers to avoid potential reimbursement issues for the user, accelerate the search query, retrieve unique pricing the organization may have negotiated, etc.

The AIP system then analyzes the search results based on at least on proprietary, organization-specific procurement rules (block 308). Following the analysis of the pre-processed product information and information stored within one or more preferred supplier data stores and the determination of potential buying options, the AIP system applies a set of proprietary, organization-specific procurement rules to narrow the list of potential buying options. An organizational rule could state that a user is recommended to buy a part that is priced up to a predefined threshold (e.g., 10%) higher than a preferred supplier. Another rule might be that a user must buy all safety products from a specific procurement supplier even when a cheaper alternative is available from another supplier.

The AIP system then provides data and/or instructions that cause the rendering of at least a portion of a GUI on a network device providing a user with one or more potential buying options to the user supplying the user input via the web browser plug-in (block 310). The instructions may include instructions regarding the display of the potential buying options, instructions regarding the alteration of a web page to display of the potential buying options, instructions regarding a redirect to display of the potential buying options, instructions regarding a pop-up window to display of the potential buying options, etc. In some embodiments, the web browser plug-in may include the instructions referenced above such that data representing the potential buying options is provided to the web browser plug-in, which then causes the rendering of at least a portion of a GUI to display of the potential buying options.

Based on the displayed potential buying options, the AIP system may receive additional user input via the web browser plug-in corresponding to selection of a buying option (block 312). Upon receipt of additional user input corresponding to selection of a potential buying option, the AIP system may then perform operations corresponding to a virtual check-out based on the additional received user input (block 314).

Illustrative Examples

Figure 4A:
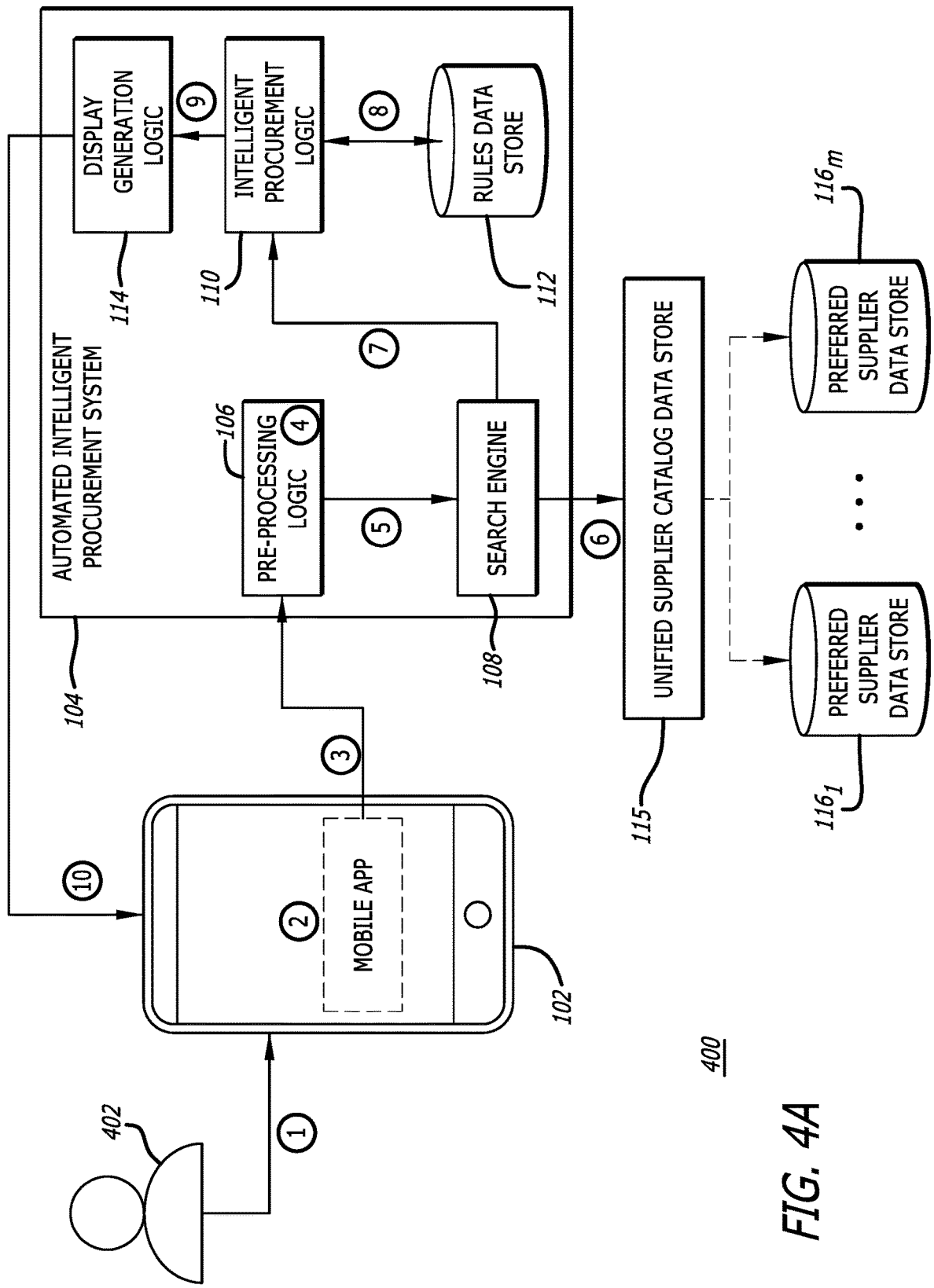
FIG. 4A is a block diagram providing an illustrative flow of first operations performed by the automated, intelligent procurement system of FIG. 1 in accordance with some embodiments.

Referring to FIG. 4A, a block diagram providing an illustrative flow of first operations performed by the automated, intelligent procurement (AIP) system of FIG. 1 is shown in accordance with some embodiments. Although FIG. 4A includes numbered operations, the indication of an ordering of the operations applies to the illustrative embodiment discussed but need not apply to all embodiments. As an illustrative example of operations performed by the AIP system 104, a user 402 provides user input to the network device 102 corresponding to a search within a website (or via a search engine) for a retail item (operation 1).

In one embodiment, the web browser plug-in 118 may identify specified user input fields by scanning the HTML code comprising a web page for input tags, as referenced above (operation 2). When user input is received by the webpage via one of the user input fields, the web browser plug-in 118 captures a copy of the received user input and the copy, or information representing the copy, is transmitted to the AIP system 104 operating on a server device (operation 3). In addition to the copy of the user input or representative information, the web browser plug-in 118 may also transmit an organization identifier that may be obtained through user profile information. For instance, prior to use of the web browser plug-in 118, the user 402 may be required to establish a user profile (e.g., login credentials, organization affiliation, etc.).

The AIP system 104 running on the server device includes the pre-processing logic 106, which, upon execution by one or more processors, performs pre-processing operations including: (1) deciphering the user's procurement need, and (2) normalizing the received user input, as discussed above (operation 4).

Following the pre-processing operations, the search engine 108 receives the pre-processed product information (operation 5). The search engine 108, upon execution by one or more processors, performs operations including alternate product search, synonym search, schema-less product information mining, image search, tunable attribute boosting. Search engine compiles a list all available results ordered by relevance up to a max number for real-time price check from preferred suppliers through supplier provided Application Program Interface (API). The search may be conducted against a proprietary data store with normalized product information from multiple preferred supplier or against each individual supplier data source in real-time. Search uses both schema based search for known attributes and schema-less search for product attribute (operation 6).

The search results are then provided to the intelligent procurement logic 110 (operation 7), which, upon execution by one or more processors, performs operations including refining the search results based on organizational parameters such as normalizing the price to incorporate benefits an organization receives such as next day shipping, added warranty, single invoice, QCI score, etc. Once the price is normalized for comparison, organizational rules are applied to order the search results in the order of greatest value. An organizational rule may recommend buying from a preferred supplier even if the price is higher up to a predefined threshold (e.g., 10%).

Figure 5A:
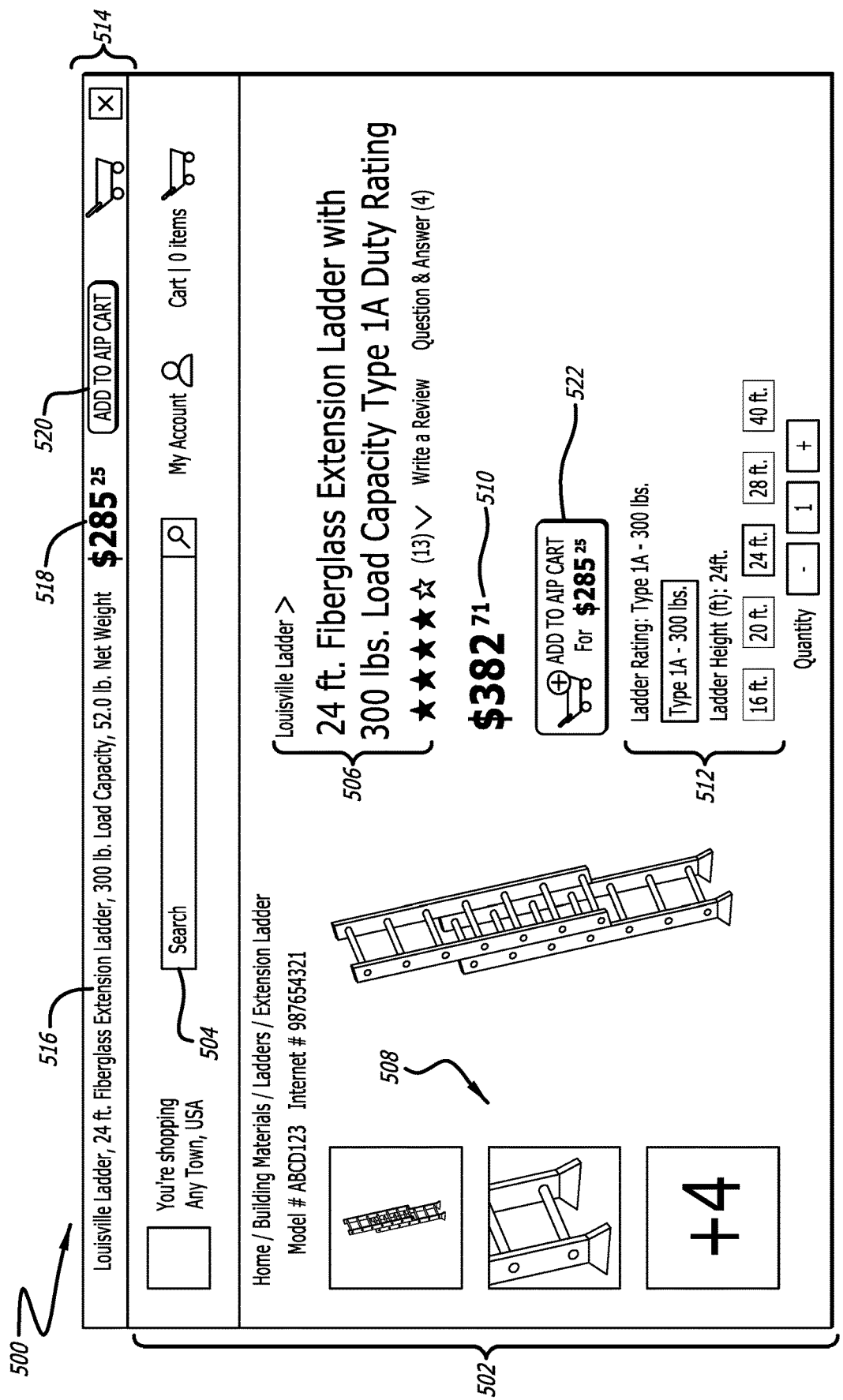
FIG. 5A is a first graphical user interface illustrating an implementation of a web browser plug-in component of the automated, intelligent procurement system of FIG. 1 in accordance with some embodiments.
Figure 5B:
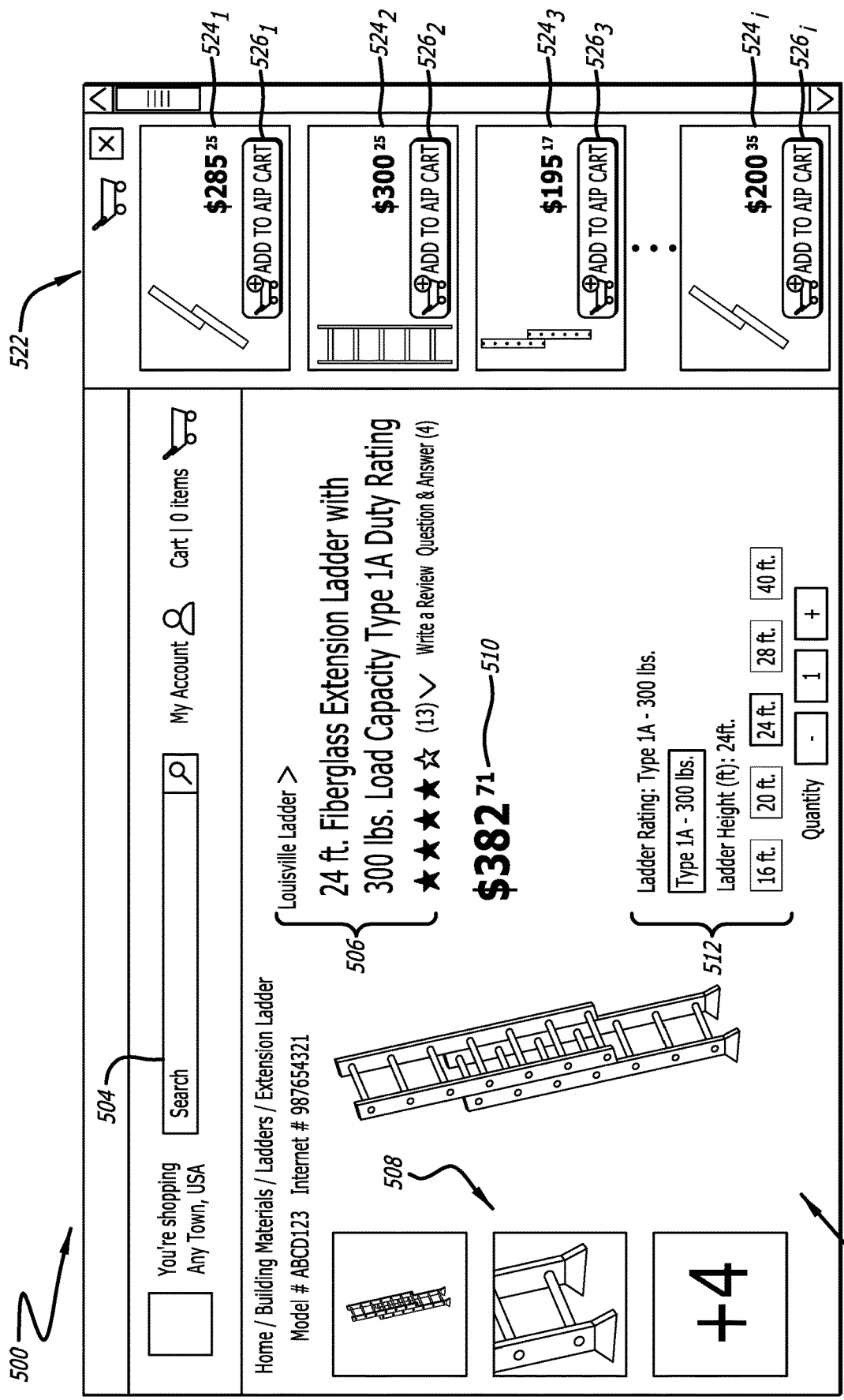
FIG. 5B is a second graphical user interface illustrating an implementation of a web browser plug-in component of the automated, intelligent procurement system of FIG. 1 in accordance with some embodiments.

Following the analysis by the intelligent procurement logic 110, the display generation logic 114 generates instructions that, upon execution by one or more processors of the network device 102, cause the rendering of a GUI or alter the rendering of a GUI. For instance, the instructions may cause the alteration of a GUI, such as a webpage, by causing visual content to be rendered in association with the webpage that is additional to visual content specified by the webpage code (e.g., added as a result of the web browser plug-in logic). In one example, the instructions are provided to the network device 102, and specifically, the web browser plug-in 118 (operation 10). The web browser plug-in 118 then, upon execution by one or more processors of the network device 102, cause rendering of at least a portion of a GUI displaying the one or more potential buying options (as seen in FIGS. 5A-5B). As will be discussed below with respect to FIGS. 5A-5B, the web browser plug-in 118 may alter the display of a web page being displayed by an internet web browser in order to provide the user 402 with alternative buying options for the same, or comparable, retail items as the item that was searched for through one or more preferred suppliers of the organization with which the user 402 is associated.

Figure 4B:
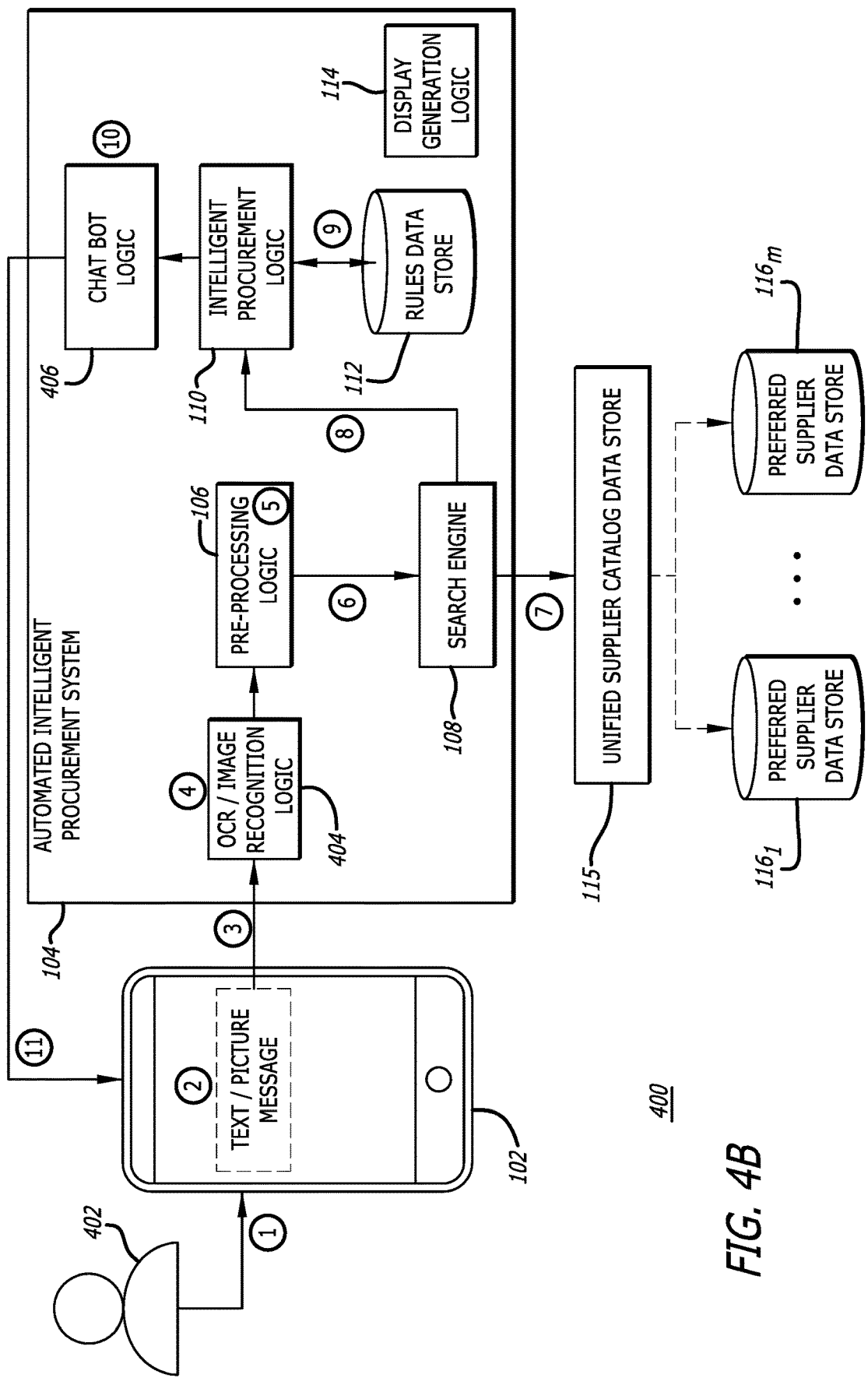
FIG. 4B is a block diagram providing an illustrative flow of second operations performed by the automated, intelligent procurement system of FIG. 1 in accordance with some embodiments.

Referring to FIG. 4B, a block diagram providing an illustrative flow of second operations performed by the automated, intelligent procurement (AIP) system of FIG. 1 is shown in accordance with some embodiments. Although FIG. 4B includes numbered operations, the indication of an ordering of the operations applies to the illustrative embodiment discussed but need not apply to all embodiments. Differently than in FIG. 4A, the embodiment of FIG. 4B corresponds to a scenario in which a user may provide user input to the network device 102 resulting in a text message (also referred to as a "short message service (SMS) message") or picture/audio message (also referred to as a "multimedia message service (MMS) message") to be transmitted to the AIP system 104, wherein the text message or picture message includes information corresponding to a retail item (operation 1). In one example, a user such as a contractor, takes a picture of an object that is needed or desired to complete a task and sends the picture to the AIP system 104 via a picture message. The text message or picture message (generally "message") transmitted from the network device 102 may include data such as text and/or visual/audio data. As will be discussed below, the AIP system 104 may include logic modules such as an optical character recognition (OCR) logic, an image recognition logic, a speech recognition logic and/or a natural processing logic.

In one embodiment, the message may be generated by the network device 102 and transmitted to the AIP system 104 operating on a server device, wherein the message includes information corresponding to a retail item (operations 2 and 3). A unique identifier (e.g., a telephone number) associated with the network device 102 from which the message was received by the AIP system 104 may be associated with an organization identifier. The association may be determined by the AIP system 104 by querying a database stored on the AIP system 104 (not shown) that stores the unique identifier and organization pairings. It may be assumed that each mobile device is registered with the AIP system 104 and a corresponding organization association is stored. In some embodiments, a mobile device is not associated with an organization, in which case, organization-specific procurement rules are not applied intelligent procurement logic 110 (discussed below).

Upon receiving the message, one or more of an OCR logic, an image recognition logic, a speech recognition logic and/or a natural processing logic (cumulatively illustrated as logic module 404 in FIG. 4B) perform operations to determine product information included in the message (operation 4). In some embodiments, upon receipt of a text message, the logic module 404 of the AIP system 104 may process the text using a syntactic analysis and/or a semantic analysis to determine the content of the text message and extract the product information. In embodiments in which an audio message is received, the logic module 404 may perform a speech recognition process that converts the audio to text, and then utilizes a syntactic analysis and/or a semantic analysis as mentioned above. In embodiments in which a picture message is received (or a video message, wherein one or more still frames of the video may be analyzed as a picture), the picture may be provided as input to a pre-trained machine learning model that performs an analysis resulting in the comparison of a representation of the provided picture to representations of a plurality of images used to train the machine learning model. The pre-trained machine learning model may then provide an identification of the provided picture, which is used as the product information.

The AIP system 104 running on the server device includes the pre-processing logic 106, which, upon execution by one or more processors, performs pre-processing operations including: (1) deciphering the user's procurement need, and (2) normalizing the received user input, as discussed above (operation 5).

Following the pre-processing operations, the search engine 108 receives the pre-processed product information (operation 6). The search engine 108, upon execution by one or more processors, performs operations including alternate product search, synonym search, schema-less product information mining, image search, tunable attribute boosting. Search engine compiles a list all available results ordered by relevance up to a max number for real-time price check from preferred suppliers through supplier provided Application Program Interface (API). The search may be conducted against a proprietary data store with normalized product information from multiple preferred supplier or against each individual supplier data source in real-time. Search uses both schema based search for known attributes and schema-less search for product attribute (operation 7).

The search results are then provided to the intelligent procurement logic 110 (operation 8), which, upon execution by one or more processors, performs operations including refining the search results based on organizational parameters such as normalizing the price to incorporate benefits an organization receives such as next day shipping, added warranty, single invoice, QCI score, etc. Once the price is normalized for comparison, organizational rules are applied to order the search results in the order of greatest value. An organizational rule may recommend to buy from a preferred supplier even if the price is higher up to a predefined threshold (e.g., 10%).

Following the analysis by the intelligent procurement logic 110, in some embodiments (e.g., when a dedicated mobile app is being utilized on the network device 102), information corresponding to the one or more potential buying options may be provided to the display generation logic 114, which generates instructions for rendering a GUI, or at least a portion thereof, corresponding to display of the one or more buying options (no operational number provided).

Following the analysis by the intelligent procurement logic 110 (or the optional display generation logic 114 processing), a chat bot logic 406 included within the AIP system 104 may generate a response message (including text and/or visual/audio data) to be transmitted to the network device 102 and displayed within a message thread (operation 10). For instance, the chat bot logic 406 may be configured with predetermined rule sets that indicate positioning/ordering of text and/or a picture within a message. Additionally, the predetermined rule sets may include specific text to incorporate into the message. A link (e.g., Uniform Resource Locator) that directs the user 402 to a web site to purchase one of the one or more potential buying options may also be obtained from the corresponding preferred supplier data store $116_1$-$116_m$ and be included within the response message.

The message generated by the chat bot logic 406 is provided to the network device 102 (operation 11). The network device 102 then displays the message within a message thread (e.g., of a messaging application installed on the phone or within an application that includes a messaging feature). As discussed herein with respect to alternative embodiments, the one or more buying options correspond to retail items offered for sale by one or more preferred suppliers of the organization with which the user 402 is associated, when applicable.

Referring to FIG. 5A, a first graphical user interface illustrating an implementation of a web browser plug-in component of the automated, intelligent procurement (AIP) system of FIG. 1 is shown in accordance with some embodiments. The graphical user interface (GUI) 500 may be, for example as illustrated, a window of a web browser. However, as discussed above, the GUI 500 may represent the display of a mobile application installed on a network device. The GUI 500 includes several rendered sections and components including a main display section 502 and a banner section 514. The main display section 502 illustrates items that are typically displayed on a traditional retailer's website including a search bar 504, an account icon, a cart icon and information corresponding to a retail item, such as a search-for retail item. The illustration of FIG. 5A uses a ladder as the searched-for retail item; however, the disclosure is not intended to be so limited and applies to all retail items. Further, the inventive concepts may be applied consumer good or service, such as food items, clothing items, vehicles, contractor services (plumbing, gardeners, florists, photographers, etc.).

The main display section 502 of GUI 500 further includes a description or title of the retail item 506 (that may include user reviews, ratings and/or questions, or links thereto), one or more images of the retail item 508, a price 510 of the retail item from retailer on whose website is being displayed, and additional parameters or specifics of the retail item (e.g., size, color, quantity, etc.).

The AIP system disclosed herein, upon performing pre-processing and analysis operations as discussed above, may cause the alteration of the display of a retailer's webpage. As shown in FIG. 5A, the web browser plug-in component of the AIP system may alter the display of the retailer's webpage to display the banner 514 and/or the button 522. The banner 514 may include a description 516 of the same or comparable retail item as the searched-for retail item, a price 518 of the same or comparable retail item as the searched-for retail item as determined by the AIP system (specifically from a preferred supplier), and an "add to AIP cart" button 520. In addition (or at times, alternatively), the web browser plug-in component of the AIP system may alter the main display section 502 to include the button 522, which represents a quick, one-click "add to AIP cart" option for the user that may display the price of the same or comparable retail item as the searched-for retail item from a preferred supplier as determined by the AIP system.

Referring to FIG. 5B, a second graphical user interface illustrating an implementation of a web browser plug-in component of the automated, intelligent procurement (AIP) system of FIG. 1 is shown in accordance with some embodiments. The graphical user interface (GUI) 500 may be, for example as illustrated, a window of a web browser. However, as discussed above, the GUI 500 may represent the display of a mobile application installed on a network device. The GUI 500 includes several rendered sections and components including a main display section 502. The main display section 502 illustrates items that are typically displayed on a traditional retailer's website including a search bar 504, an account icon, a cart icon and information corresponding to a retail item, such as a search-for retail item. As with FIG. 5A, the illustration of FIG. 5B uses a ladder as the searched-for retail item; however, the disclosure is not intended to be so limited and applies to all retail items as well as any consumer goods or services as referenced above.

The main display section 502 of GUI 500 further includes a description or title of the retail item 506 (that may include user reviews, ratings and/or questions, or links thereto), one or more images of the retail item 508, a price 510 of the retail item from retailer on whose website is being displayed, and additional parameters or specifics of the retail item (e.g., size, color, quantity, etc.).

The AIP system disclosed herein, upon performing pre-processing and analysis operations as discussed above, may cause the alteration of the display of a retailer's webpage. As shown in FIG. 5B, the web browser plug-in component of the AIP system may alter the display of the retailer's webpage to display a side panel 522. The side panel 522 may include a plurality of potential buying options $524_1$-$524_i$, wherein each potential buying option $524_1$-$524_i$ may include an image of the retail-item, a price, a name/description of the same or comparable retail item as the searched-for retail item (not shown) and/or an "add to AIP cart" button $526_1$-$526_i$. As with FIG. 5A and other embodiments discussed herein, the potential buy options $524_1$-$524_i$ may be of the same or a comparable retail item as the searched-for retail item as determined by the AIP system (specifically from a preferred supplier). In some embodiments and in addition to causing the rendering of the side panel 522, the web browser plug-in component of the AIP system may alter the main display section 502 to include the button 522 of FIG. 5A.

Figure 5C:
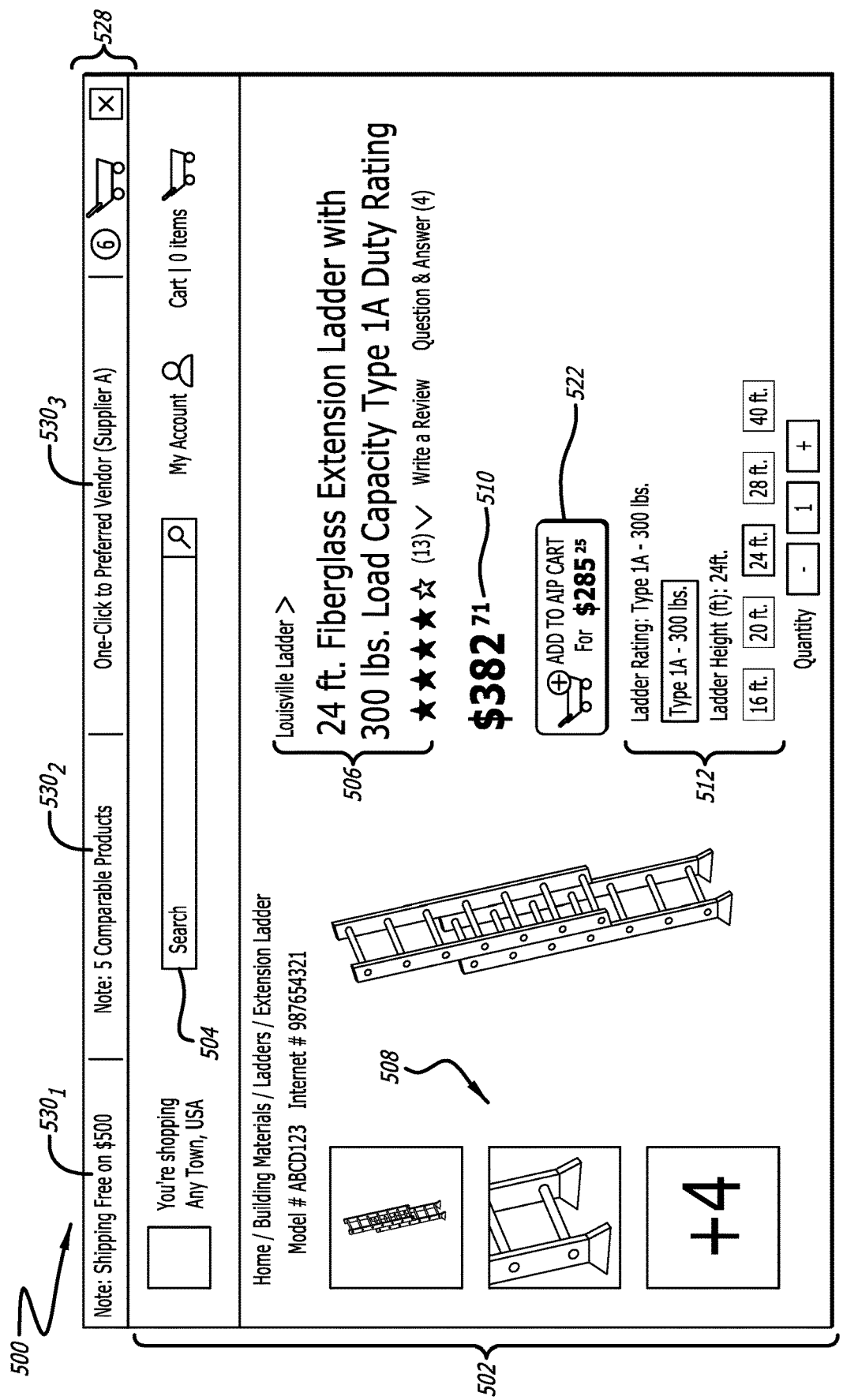
FIG. 5C is a third graphical user interface illustrating an implementation of a web browser plug-in component of the automated, intelligent procurement system of FIG. 1 in accordance with some embodiments.

Referring now to FIG. 5C, a third graphical user interface illustrating an implementation of a web browser plug-in component of the automated, intelligent procurement (AIP) system of FIG. 1 is shown in accordance with some embodiments. The GUI 500 may be, for example as illustrated, a window of a web browser. However, as discussed above, the GUI 500 may represent the display of a mobile application installed on a network device. The GUI 500 as illustrated in FIG. 5C includes several rendered sections and components including a main display section 502 that are discussed above with respect to FIG. 5A.

However, differently, the GUI 500 of FIG. 5C replaces the banner section 514 of FIG. 5A with the banner section 528. The banner section 528 is similar as the banner section 514 in that the web browser plug-in component of the AIP system may alter the display of the retailer's webpage to display the banner 528. The banner 528 may include the sections $530_1$-$530_i$ (i≥1, where i=3 for the illustrated embodiment). Each section $530_1$-$530_3$ may provide information to the user that may assist in the user's purchasing decisions. For example, the information may provide information associated with certain negotiated supplier contracts (e.g., shipping discounts, product discounts, bulk purchasing discounts), navigation queues (e.g., one-click navigation to a preferred supplier, one-click navigation to a listing of comparable products), or general messages such as an indication that the AIP system has determined that there are comparable products to view.

The web browser plug-in component of the AIP system, and specifically the banner 528, may be targeted to solve technical difficulties in the Procure-to-Pay (P2P) space. Those who use P2P systems (e.g., company employees, technicians and other industry professionals described above are forced to perform shopping through a P2P portal due to a lack of alternatives. The term P2P portal may refer to an enterprise application used to manage the procurement process. Typically, users navigate a P2P portal, which includes clicking through supplier information (e.g., logos, text, etc.) to navigate to a desired supplier's catalog. The procurement process becomes very cumbersome when the user is to refer to multiple suppliers' catalogs. For example, an extended amount of time may be required to click through several suppliers' catalogs in order to find a particular product and compare with other suppliers' prices and comparable products. Additionally, the antiquated navigation of P2P portals often leads user astray (e.g., users end up on webpages display portions of the P2P portal that are irrelevant to their procurement process leading to wasted computing resources). Further, as various suppliers may have negotiated different contracts (discounts or other rates) with the user's employer, the user is forced to maintain this information manually while navigating to different suppliers' catalogs. Employers are quick to note that such negotiated discounts or rates are not always utilized due to a lack of knowledge by employees using traditional P2P portals.

However, the web browser plug-in component of the AIP system solves the problems associated with traditional P2P portals by altering the display of a webpage to include the banner 528. As noted above, the banner 528 provide one-click links to comparable products as determined by the AIP system as discussed above. Further, the web browser plug-in component may include information related to negotiated discounts or rebates so that the user is able to take full advantage of such. For instance, as one non-limiting example, the information in section $530_1$ states that free shipping has been negotiated when the procurement purchase is at least $500 for the particular supplier corresponding to the purchase offer presented in the main display section 502. As the user navigates to view a product by a different supplier, the section $530_1$ may update according to a different rebate or discount negotiated with the new supplier. In some embodiments, the section $530_1$ may be altered to emphasize that the applicable rebate or discount of the previous supplier was greater than a comparable-type of current rebate or discount offered by the current supplier (e.g., a shipping-type discount comparison, where, for example, the new supplier only provides 50% off of shipping with a $500 purchase but the previous supplier provides free shipping, as shown in FIG. 5C). Additionally, in such a case, the banner 528 may provide a one-click link to the previous supplier's purchase offer.

Referring again to FIG. 5C, the section $530_2$ includes a note that the AIP system has determined there are comparable products to review. The section $530_3$ provides a one-click link to a preferred vendor for a given product or product-type (e.g., ladders) or industry-specific field (e.g., construction equipment).

As noted above, while the AIP system and inventive concepts are described herein with respect to retail items ("materials"), the AIP system and inventive concepts are applicable to various industries including, but not limited or restricted to, information technology, healthcare (particularly as care is extended out of hospitals and to the home), building trades (electrical, mechanical, plumbing, etc.), real estate (e.g., property managers), logistics, etc.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory computer readable storage medium having stored thereon logic that, upon execution by one or more processors, performs operations comprising:
   receiving user input via a graphical user interface (GUI) of a webpage displayed on a network device, where the user input corresponds to product information corresponding to a retail item searched for via the network device;
   scanning, by a web-browser plug-in processing on the network device, code comprising the webpage for an input tag indicating presence of an input field;
   capturing a copy of the user input receiving at the input field;
   transmitting the user input captured at the input field to logic processing on a server device;
   performing, by the logic processing in the server device, pre-processing operations on the product information;
   querying one or more data stores to obtain potential buying options corresponding to the retail item, wherein each of the one or more data stores house information corresponding to a preferred supplier;
   analyzing query results based on at least on proprietary, organization-specific procurement rules to determine at least one recommended buying option; and
   causing rendering of at least a portion of the GUI on the network device that displays the at least one recommended buying option.

2. The storage medium of claim 1, wherein scanning by the web-browser plug-in includes scanning Hyper Text Markup Language (HTML) code comprising the webpage for the input tag indicating the presence of the input field.

3. The storage medium of claim 1, wherein the GUI comprises a portion of the webpage.

4. The storage medium of claim 3, wherein causing the rendering of at least the portion of the webpage includes adding a button within a main display section of the webpage, wherein selection of the button initiates operations to add a first recommended buying option to a virtual shopping cart.

5. The storage medium of claim 3, wherein causing the rendering of at least the portion of the webpage includes adding a banner to the webpage that includes a button, wherein selection of the button initiates operations to add a first recommended buying option to a virtual shopping cart.

6. The storage medium of claim 1, wherein determining the at least one recommended buying option includes consideration of a Contribution Index (CI) score for each potential supplier.

7. The storage medium of claim 1, wherein the at least one recommended buying option includes a delivery option being one of at least (i) next day delivery, (ii) local pickup, or (iii) delivery via a rideshare service.

8. The storage medium of claim 1, wherein a first queried data store of the one or more data stores is a normalized data store that contains domain specific tagging.

9. The storage medium of claim 8, wherein content within the normalized data store is cross-referenced using a machine learning model, wherein the machine learning model is trained on a set of products for each of a plurality of product categories.

10. The storage medium of claim 8, wherein content within the normalized data store is cross-referenced using an artificial intelligence algorithm including one or more rule sets.

11. The storage medium of claim 9, wherein results of either (i) applying the machine learning model to the user input corresponding to product information or (ii) performance of an artificial intelligence algorithm are stored in the normalized data store, wherein the normalized data store is configured to be queried during subsequent cross-referencing operations.

12. A system comprising:
a processor; and
non-transitory computer readable storage medium having stored thereon logic that, upon execution by one or more processors implemented within a server, performs operations comprising:
receiving user input via a graphical user interface (GUI) of a webpage displayed on a network device, where the user input corresponds to product information corresponding to a retail item searched for via the network device;
scanning, by a web-browser plug-in processing on the network device, code comprising the webpage for an input tag indicating presence of an input field;
capturing a copy of the user input receiving at the input field;
transmitting the user input captured at the input field to logic processing on a server device;
performing, by the logic processing in the server device, pre-processing operations on the product information;
querying one or more data stores to obtain potential buying options corresponding to the retail item, wherein each of the one or more data stores house information corresponding to a preferred supplier;
analyzing query results based at least on proprietary, organization-specific procurement rules to determine at least one recommended buying option; and
causing rendering of at least a portion of the GUI on the network device that displays the at least one recommended buying option.

13. The system of claim 12, wherein scanning by the web-browser plug-in includes scanning Hyper Text Markup Language (HTML) code comprising the webpage for the input tag indicating the presence of the input field.

14. The system of claim 12, wherein the GUI comprises a portion of the webpage.

15. The system of claim 14, wherein causing the rendering of at least the portion of the webpage includes adding a button within a main display section of the webpage, wherein selection of the button initiates operations to add a first recommended buying option to a virtual shopping cart.

16. The system of claim 14, wherein causing the rendering of at least the portion of the webpage includes adding a banner to the webpage that includes a button, wherein selection of the button initiates operations to add a first recommended buying option to a virtual shopping cart.

17. The system of claim 12, wherein determining the at least one recommended buying option includes consideration of a Contribution Index (CI) score for each potential supplier.

18. The system of claim 12, wherein the at least one recommended buying option includes a delivery option being one of at least (i) next day delivery, (ii) local pickup, or (iii) delivery via a rideshare service.

19. The system of claim 12, wherein a first queried data store of the one or more data stores is a normalized data store that contains domain specific tagging.

20. The system of claim 19, wherein content within the normalized data store is cross-referenced using a machine learning model, wherein the machine learning model is trained on a set of products for each of a plurality of product categories.

21. The system of claim 19, wherein content within the normalized data store is cross-referenced using an artificial intelligence algorithm including one or more rule sets.

22. The system of claim 21, wherein results of either (i) applying a machine learning model to the user input corresponding to product information or (ii) performance of the artificial intelligence algorithm are stored in the normalized data store, wherein the normalized data store is configured to be queried during subsequent cross-referencing operations.

* * * * *